United States Patent

Hayashi et al.

[11] Patent Number: 5,832,455
[45] Date of Patent: Nov. 3, 1998

[54] WORK FLOW SUPPORT SYSTEM

[75] Inventors: Shoichi Hayashi; Toru Aratani; Kil-Ho Shin, all of Yokohama, Japan

[73] Assignee: Fuji Xerox Co., Ltd., Tokyo, Japan

[21] Appl. No.: 534,384

[22] Filed: Sep. 27, 1995

[30] Foreign Application Priority Data

Sep. 30, 1994 [JP] Japan .................................. 6-237007

[51] Int. Cl.⁶ ................................................. G06F 17/60
[52] U.S. Cl. ........................................... 705/7; 395/182.13
[58] Field of Search ...................... 705/7, 9; 395/200.37, 395/200.49, 200.77, 182.13, 182.14, 182.17, 182.18; 706/45, 47

[56] References Cited

U.S. PATENT DOCUMENTS 5,398,329  3/1995  Hirata et al. ....................... 395/182.09
5,446,740  8/1995  Yien et al. ......................... 395/200.77
5,627,764  5/1997  Schutzman et al. ............... 395/200.37

*Primary Examiner*—Edward R. Cosimano
*Assistant Examiner*—Barton L. Bainbridge
*Attorney, Agent, or Firm*—Oliff & Berridge, PLC

[57] ABSTRACT

A user operates a user interface to select a rule for executing the process of a work flow, which is stored in a personal data base or a shared data base, and sends the conditional part of the selected rule as the goal to a query portion. Then, the query portion successively executes the process of the work flow through the computation by the SLD contradiction. When the goal fails in the execution by the computation, the failure goal is transferred as a tapple to the tapple space. The tapple is solved by another query portion, and the result of executing the tapple is returned to the tapple space. If a rule for executing the tapple is not found, the task is processed by man or a user and the result of the processing is entered into the system. In answer to this, the system interprets that the task has been proved to be true, and continues the execution of the work flow process.

11 Claims, 2 Drawing Sheets

WORK FLOW SUPPORT SYSTEM

BACKGROUND OF THE INVENTION

The present invention relates to a work flow support system for supporting a group work and a work flow in a decentralized environment in which a plural number of information processing devices are interconnected by a network.

Generally, the work flow means a flow of work. Let us consider a case where a company employee purchases an article. In this case, he draws up a purchase slip and takes it to his superior. The superior checks the slip, and if he approves the purchasing of the article, signs the slip for his approval. And he delivers the signed slip to the accounting division. The accounting division gives an order for the article according to the purchase slip. The work will further be continued. Thus, the purchase slip is delivered from an employee to his superior, and then to the accounting division. In this way, the work progresses. Such a flow of work is called a work flow.

In the above case, the work pieces, such as to draw up the purchase slip, to check and sign the purchase slip, to give the order for the article, and the like, form the units of work, respectively. The unit of work is called a task. A work flow consists of a series of tasks. Sometimes each task is divided into a plural number of subtasks. Some tasks are done by man, and some tasks are automatically done by a machine, for example, a computer.

Recently, in offices, factories, and the like, a number of work positions therein are equipped with information processing devices. These devices are interconnected by a network, thereby forming a decentralized environment. Users who handle their information processing devices do the work assigned to them, respectively.

The development of the systems for supporting a work flow in which a plural number of users who handle the information processing devices are concerned progresses in the decentralized environment. These systems are based on the electronic mail. The work flow is defined by defining a route for delivering a document by the electronic mail. In the case as mentioned above, a slip delivery route ranging from the employee who draws up the purchase slip through the superior to the accounting division is defined, and the purchase slip is delivered through this route by the electronic mail. In the system based on the electronic mail, basically a document moves from a user environment to another user environment. In the user environment where the document reaches, the next destination is uniquely determined by executing the procedure or evaluating the condition. When some routes to be selected are present, the condition for the document to select one of these routes is defined for each route. One route is determined by referring to a specific part of the document. There is known a system which defines such a document delivery route by a graphical user interface.

The conventional system realizes a work flow by automatically determining a document delivery route. In this sense, the conventional system is a document basis system. There are various ways of managing the procedures. A first way of managing the procedures is to manage all of the procedures by a server. A second way is to manages the procedures for each user environment. A third way is to bury the procedures in the document to be delivered.

In the conventional work flow support system, the destinations to which an electronic mail is successively transmitted must be determined in advance. In some type of the system, the rule for the work flow are described in a procedural manner. Also in this system, the rule must be described so as to uniquely determine the destinations. In some cases, the variable of which the value must be determined before the procedure advances to the next task is determined for each task. This results in complexity of the described procedure. It is impossible to flexibly change the order of executing tasks described in the rules of the work flow.

The system a little functions for such an exceptional situation that cannot be described in the rule in anticipation of the situation. In an extreme case, the system is inoperable when the exceptional situation occurs and in the subsequent procedural operation of the work flow.

Accordingly, an object of the present invention is to provide a work flow support system for supporting a work flow, in which the execution of the process of a part of the work flow, which concerns a user, can be automated when he merely forms the rules of the conditions and the way of doing the work about the procedure of only that part of the work flow, even if he has no or a little knowledge on the whole work flow, and the conditions and the order for the task execution, and the execution of the tasks of the whole work flow and the transfer of the results are controlled by managing the connections among those partial processes of the work flow, and the connection of those tasks processed by the system to the task that is processed by man since the rule for processing the task is not determined.

SUMMARY OF THE INVENTION

According to the present invention, there is provided a work flow support system, comprising: a plural number of rule-group storing means for storing rules, each of the rules consisting of a conditional part and an executable part, both the conditional part and the execution part being declaratively stated in the rule, the conditional part being used for determining whether or not the rule to be applicable to a started up task as the unit of a work, and the conditional part being for executing the tasks which satisfy the conditional part; and an interpreting/executing means provided respectively in association with said rule-group storing means, when a task is started up, said interpreting/executing means selecting a rule having the conditional part applicable to the task from among those in said rule-group storing means, and successively executing a series of tasks contained in the execution part associated therewith.

According to the present invention, a rule of a task of a work flow is divided into a series of tasks. These are separately stored into the rule-group storing means. Each of the interpreting/executing means, provided respectively in association with the rule-group storing means, successively starts up. When a task is started up, by a selected rule that is stored the rule-group storing means associated therewith, the rule select means selects a rule having the execution part applicable to the started-up task. The selected task is applied and the execution part of the selected task is successively started up.

When the interpreting/executing means fails to find the rule having the conditional part applicable to the task in the rule-group storing means, or when a task is forcibly put in a failure state by a condition defined by the system and an input from a user, the task being put in a failure state is detected. The condition defined by the system involves a state that no execution result is produced after a preset period of time, and a state when the interpreting/executing means goes back because of a rejection state to be described later, the system forcibly puts the task in a failure state.

To recover the task from its failure state and continue the execution of the process of the work flow, it is necessary to select an applicable rule again or to request another interpreting/executing means or a user to execute the task. The task is recovered from its failure state by the result of the execution of the task that is carried out by the interpreting/executing means or the user.

When neither the interpreting/executing means nor the user produces the task execution result, and the interpreting/executing means cannot select the rule, the task cannot be recovered from its failure state. The system recognizes this state as a rejection state, and goes back to the preceding task and puts the task in a failure state, and continues the execution of the work flow process.

Thus, since a rule is selected and is applied upon executing a task, the work flow support system is triggered only by the starting up the first task, on the basis of the declaratively state rules, so that the subsequent tasks are successively started up and transferred, and the process of the work flow is progressively executed. Thus, there is no need of describing entirely the address from the beginning, although the address must be described so in the conventional electronic mail. In the present invention, it is possible to automatically transfer the task to the interpreting/executing means which can execute the task upon executing through selecting a rule. Further, the user does not need to explicitly describe the procedure of the conditional branch that occurs in the execution of the tasks. All the user has to do is to declaratively state some rules and to store them into the rule-group storing means.

Further, it is possible not only to perform a task only by a computer such as searching a database, and operating an application, but also to perform a task by a man so as to continue a workflow.

The task may be started up in a state that the value of a variable is undetermined. In this case, the variables having undetermined values may be determined in their values, on the task started up. In an example, when the user processes the task as in the invention of claim 2, he can know the process not yet completed and the contents of the processing result to be inputted. And he copes with it.

DETAILED DESCRIPTION OF THE PREFERRED EMBODIMENTS

Owing that the work flow support system of the present invention is constructed in a decentralized system connected by a network, the work flow support system may be accessed and used by a plural number of users who use a plural number of terminals and a plural number of groups. Accordingly, if all or some of the rule-group storing means and the interpreting/executing means associated therewith are assigned to one user or a plural number of groups, the interpreting/executing means looks up a user or a group who can execute the next task, at a point in the flow of executing a task, and requests the user or group to execute the task. The user, who receives the task, executes the task in his manner defined by his environment.

Figure 1:
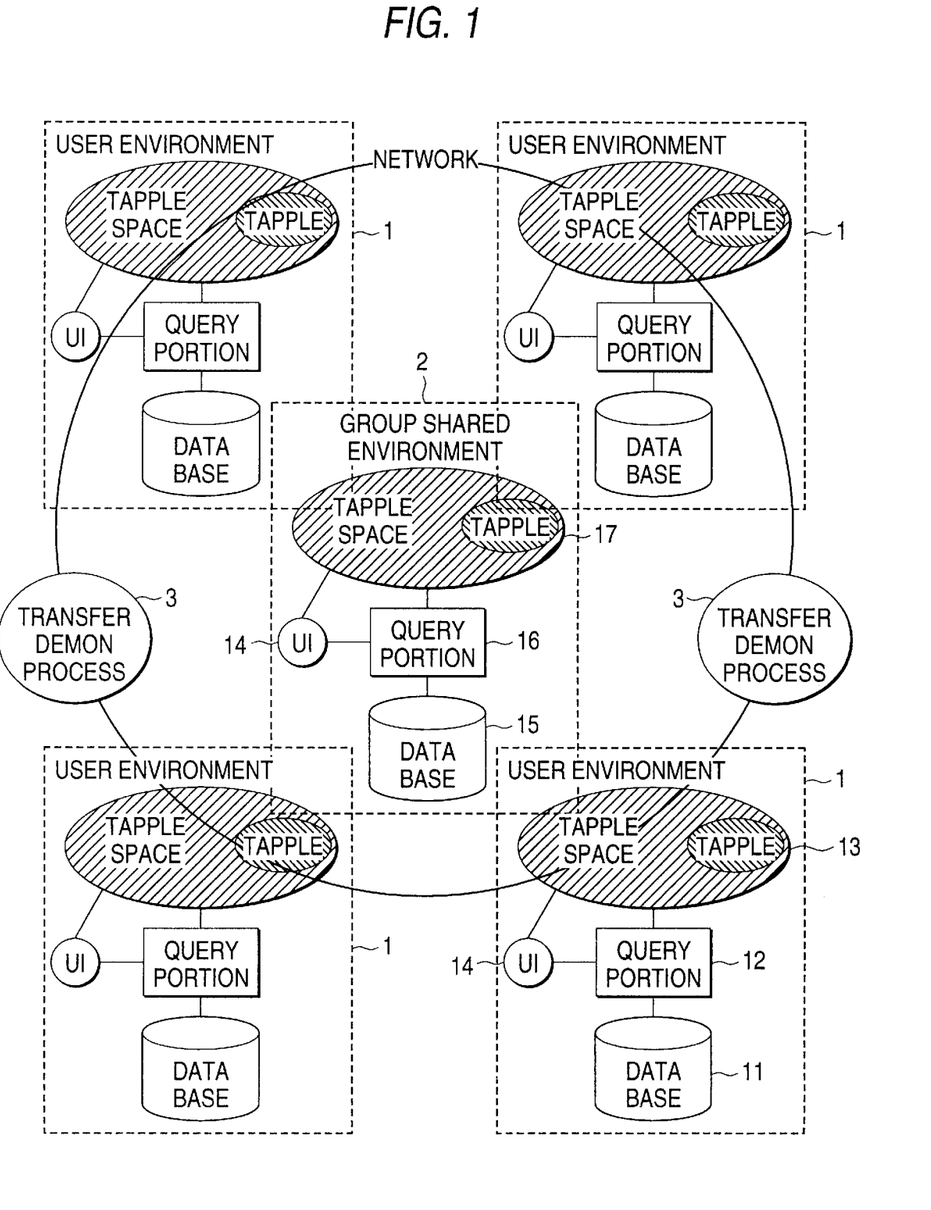
FIG. 1 is a diagram showing an embodiment of a work flow support system according to the present invention.

FIG. 1 is a diagram showing an embodiment of a work flow support system according to the present invention. In the figure, reference numeral 1 designates a user environment; 2, a group shared environment; 3, a transfer demon process; 11 and 15, data bases; 12 and 16, query portions; 13, 17, tapple spaces; and 14, a user interface. In FIG. 1, each environment is conceptually illustrated. Physically, a plural number of terminals are connected to a network. A user operates his terminal. The user environment 1 is set for each user, but does not need to be set for each terminal. The group shared environment 2 is set for each group of users, but does not need to be set for a specific terminal. The data base may be stored in a storage device attached to the terminal used by a user or may be set in a storage device of another terminal. In the latter case, the user makes an access to the data base of another terminal, through the network.

The user environment 1 contains a personal data base 11 used for a user who does a work in the environment. Logically, the data base is managed for each user. The personal data base 11 stores the information on the user, the rules on the work flow, and the like. The information and the rules may be managed by different data bases, respectively. In the description to follow, those are managed by the same data base.

The group shared environment 2 contains a data base 15 for a group of users. The group is set up for each case to which the work flow support system is applied, independently of the system. In other words, the system does not place any limit to the setting up of the group. The data base 15 stores the information shared by the grouped users, the rules of the work flow, and the like. The data base 15 is also logically shared by the grouped users. A plural number of data bases 15 may be provided, and a user may belong to a plural number of groups.

The word, "the rule" of a work flow, indicates a declarative statement of a series of subtasks, which results from development of a task. The rule of the work flow consists of a conditional part and an execution part. The conditional part includes a statement of a variable for data transfer. If the conditional part holds, a series of tasks described in the execution part are started up in successive order. Each task in the execution part, when started up, is put in an execution ready status, an execution failure state or an under-execution state, and when its execution ends, it is put in an achievement state or a rejection state. The execution of the task includes various processes, such as the application of the rule, the retrieval for the data base 11 (or 15), and the starting of an application program, and also the process carried out by a user on the user interface 14.

The data base 11 (or 15) stores information on personal attributes and related organizations, documents to be processed by a work flow, and the like, in addition to the information on the users and groups.

In storing the information stored in the data base 15 in the group shared environment 2 and the personal data base 11 in the user environment 1, it is preferable to classify the information into personal information used for a specific user or users and information to be shared by the users of the group. Any other limit is not placed on the storage of the information. The system does not place any limit on the storage, as a matter of course. Sometimes the way to do a work that is taken by a user is different from that by his group. In this case, the same information may be stored in different data base 15, or in a data base 11 and its related data base 15. Further, it is allowed that a rule already present in the data base 15 is altered for the personal reason of the user and is stored into the data base 11. Only the data base 11 or 15 may be used.

The query portion 12 (or 16) is provided in association with the data base 11 (or 15). The query portion receives instructions of starting up a rule and retrieving the rule, and interprets and executes the instructions. For example, the query portion receives requests to searching the data base 15 for a superior or an accounting clerk, and for the form of a purchase slip, and returns the answers to the requests. When the rules of a work flow and other information are stored in the same data base, the reasoning based on the derivative principle may be applied to the retrieval for the data base as for the method of retrieving the rule of the work flow, that is next applicable. When the rules of a work flow and other information are stored in the different data bases, the use of a data-base query language processing system usually used, such as SQL or QBE provides an efficient retrieval. The routinized rules are incorporated into the query portion 12 (or 16) in advance. These rules are used for starting up an application program and for retrieving necessary information.

Specifically, the query portion 12 (or 16) performs a computation by the SLD contradiction, and is realized as in the manner of the interpreter for the logical language, a Prolog language. For the specification of the Prolog language, reference is made to Clocksin, Mellish, Prolog programming, the Japan Computer Association, and the like. In this case, the rule of the work flow is divided into the Horn clauses of the first order predicative logic, and it is expressed in terms of the Horn clauses. Those are stored in the data base 11 (or 15).

The query portion 12 (or 16) receives a query from the user interface 14, and starts the proving calculation by the derivative logic for proving a goal, which the conditional part of the contents of the query, or the rule of an instructed work flow. In the query portion 12 (or 16), the application of the rule of the work flow and a series of tasks in the execution part, which are developed by the application of the rule, are a calculation process for proving the first task. When the task treated as the goal is placed to an achievement status, it has been proved to be true. When it is placed to a rejection status, it has been proved to be false.

When the task treated as the goal is under execution or is located in a tapple space to be described later, the goal is in an undetermined state, viz., it is not yet determined to be true or false. To obtain the true/false value of the goal is called "to solve the goal". By a method of proving, a state that the goal cannot be determined to be true or false is called "the goal is unsolvable" or "the goal fails in its execution". When the proof is recorded, the work flow except a redundant part, such as a backtrack, is recorded. The values of the variables are the users and the documents that have a commitment to the execution of the work flow. The record of the proof, when it is kept, may be used for various useful purposes. For example, a list of work flows is obtained, and a quick dispatch of business such as managing the related documents by a unit of work is realized by tracing the work flow.

When a goal fails in its execution in the personal data base 11, in a calculation by SLD contradiction, the query reselects a rule having a conditional part secondarily matching a goal, and tries in another proving path. The query portion 12 of the present invention can request another query portion 12, 16, or a user to prove the unsolvable goal, through a tapple space, for other proof, as will be described later. In the logical language such as the Prolog, through all proof paths, "the goal is unsolvable", that is, a rule having the conditional part which matches the goal is not found in the data base 11, is interpreted as "the goal is proved to be false". Further, in the present embodiment, it is possible that the query requests another environment or another user to prove the goal. When the proof is in the false, it is first interpreted that the goal is proved to be in the false. The timing when the query requests another environment or another user to prove the goal may lead or follow regarding reselecting a rule.

The tapple space 13 (or 17) is a shared space that can be accessed by a plural number of query portions 12 (or 16). When a goal fails in its execution in the personal data base 11, the failure goal is written as a tapple into the tapple space 17 of the group shared environment 2. A tapple appearing in the tapple space 17 of the group shared environment 2, for example, is written into the tapple space 13 of the user environment 1 by the transfer demon process. The tapple is read out of the tapple space 13 (or 17) by the query portion 12.

The transfer demon process 3 reads a tapple from the tapple space 13 (or 17), and transfers it to another tapple space 13 (or 17).

The user interface 14 is used when a user asks the system for a work, and a user informs the system of the task that is processed by a user, and enters the result of the processing of the task to the system. To ask the system for a work, or to start up the work flow, a user operates the user interface 14 to select a task that corresponds to the conditional part of the rule for the work flow stored in the personal or the shared data base 11 or 15, and transfers it as the goal to the personal query portion 12.

Figure 2:
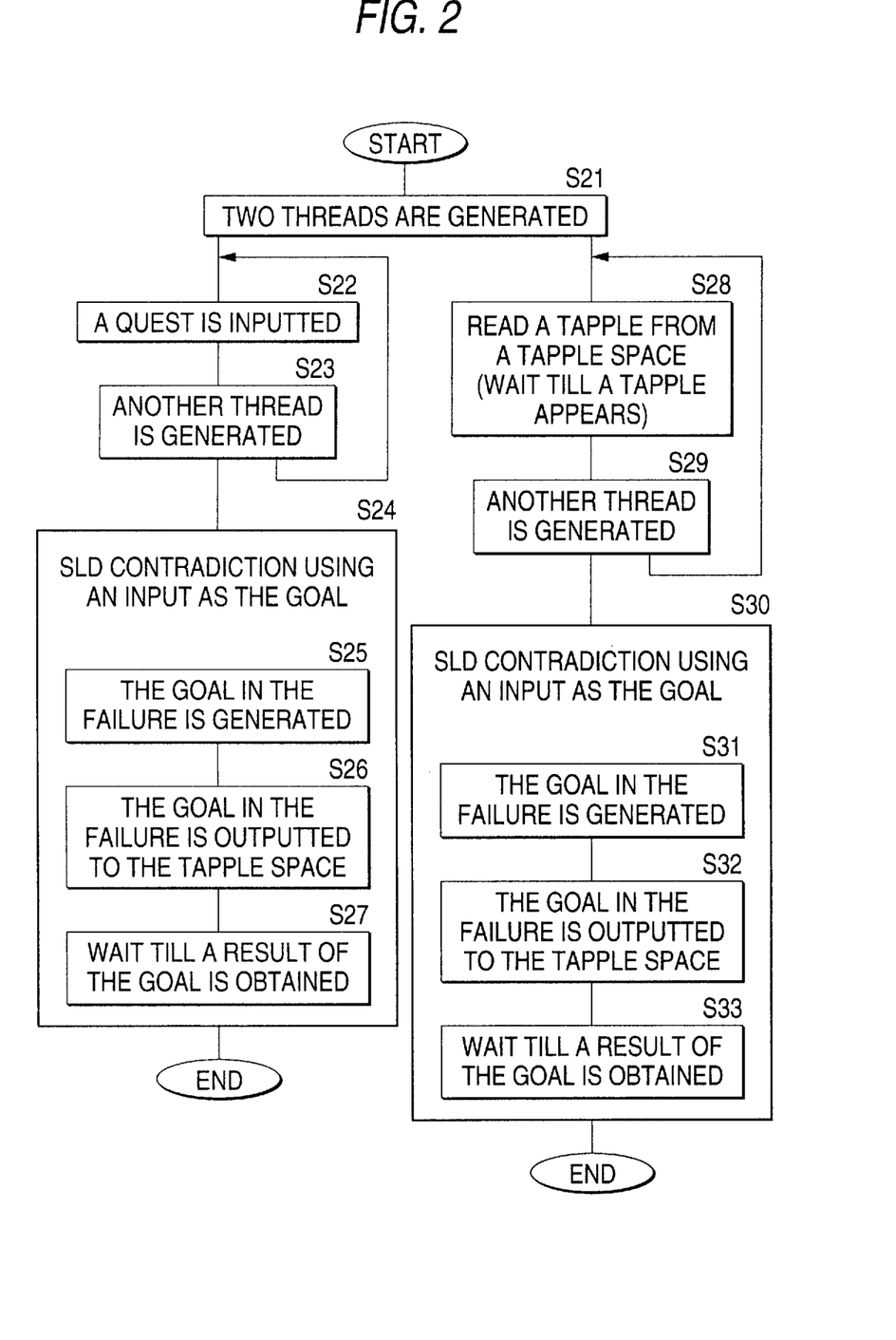
FIG. 2 is a flow chart showing an example of the operation of a query portion 12 in a user environment 1 in the work flow support system of the invention.

FIG. 2 is a flowchart showing an example of the operation of the query portion 12 in the user environment 1. The query portion 12 may be constructed so as to execute a multi-thread processing. In this environment, when a task is being executed, a goal appearing in the tapple space 13 is concurrently executed.

In a step S21, the query portion 12 generates two threads. One of the generated threads is for processing a task of a work flow requested by a user (This thread will be referred to as a first thread.). The other is for processing a goal appearing in the tapple space 13 (This thread will be referred to as a second thread.). In the first thread, viz., the thread for processing a task of a work flow requested by the user, the query portion 12 receives an input of quest from a user in a step S22. In a step S23, another thread is generated, and in the first thread, the query portion 12 carries out a computation by the SLD contradiction, with the received quest as the goal.

In the present invention, when the query portion 12 is unsuccessful in executing the goal, the failure of executing the goal is detected in a step S25, except a case of reselection of another rule which is a calculation of SLD contradiction, and this goal is outputted to a user interface 14 or the tapple space 17 of the group shared environment 2 in a step S26. In a step S27, the query portion 12 stops the operation of the thread till a result of executing a process of the goal that was unsuccessful in its execution is obtained after the execution in another condition or by a user. When receiving the result of executing the process of the goal, the query portion 12 reads it and continues the computation by the SLD contradiction. In the second thread in the step S23, the query portion 12 returns to the step S22 for dealing with another query.

The second thread, viz., the thread for processing a goal appearing in the tapple space 13, waits till a tapple is written into the tapple space 13 (step S28). When a tapple is written into the tapple space 13, the query portion 12 reads the tapple, and generates a thread for processing the tapple (step S29). In the first thread, the query portion 12 carries out a computation by the SLD contradiction using the read tapple as the goal, as in the step S24 (step S30). A process for dealing with the case where the query portion 12 fails in executing the goal, is carried out in steps S31 to S33, as in the steps S25 to S27. When the computation ends, the query portion 12 returns the result of the goal execution to the party who requested the current query portion to process the task, and ends the processing operation. In the second thread, the query portion 12 returns to the step S28 and is standstill and ready for dealing with a case where another tapple is written into the tapple space 13.

In this way, the query portion 12 in the user environment 1 can process a plural number of work flows, which are requested by the user, and the goals appearing in the tapple space 13 in a concurrent manner.

Of the processing operations by the query portion 16 in the group shared environment 2, the following processing operations are carried out as the processing operations by the query portion 12 in the user environment 1 (FIG. 2): a) the operation for processing a tapple written into the tapple space 17 by the query portion 16 in another group shared environment 2 or the query portion 12 in a user environment 1, and b) the operation for processing a quest received from the user interface 14 in a group shared environment 2. A tapple outputted from the query portion 16 in the group shared environment 2 is written into the tapple space 17. The tapple written into the tapple space 17 is not processed by the query portion 16 which outputs the tapple per se. It is processed in one of the following methods.

In the first method, a user who can solve the goal makes an access to the goal stored in the tapple space 17, through the user interface 14, and processes the readout goal as his own goal, and enters the result of the processing of the goal into his query portion, from the user interface 14. The tapples contained in the tapple space 17 of a group shared environment 2 may basically be accessed by any user who belongs to the group of the group shared environment 2. In this case, it is inconvenient that an excessive amount of data that are unnecessary for the user is presented to the user. To avoid this, a filter function may be incorporated into the user interface 14. Where the user interface 14 has the filter function, each user sets the filtering conditions in the user interface 14 so that only the data relating to the user himself is presented to the user. In an alternative, the query portion 12 in the user environment 1 always refers to the tapple space 17 in its related group shared environment 2, and reads a solvable goal out of the tapple space 17, and executes the goal.

The second method is to move that tapple to another tapple space 13 or 17 by using the transfer demon process 3. This method is used in any of the following cases: A user who can solve the goal by using the data in the data base 15 or another group containing a user who can solve the goal is uniquely determined, Any user who can refer to the data base cannot solve the goal, and A plural number of users who can solve the goal are present, but any body will not execute the goal after a preset period of time.

In the second method, the transfer demon process 3 looks up a user who ought to execute the tapple, and transfers the tapple to the tapple space 13 or 17 of the user. When it is found that a plural number of users who can solve the goal by using the information in the data base 15 are present, but any body will not execute the goal after a preset period of time, the goal is moved to the tapple space of any of those users and urges him to execute the goal.

The operation of the work flow support system when it is applied to a specific example will be described. The specific example to follow is a work flow process carried out when a user purchases an article. In this example, a rough flow of the purchasing work is: 1) The user draws up a purchase slip for purchasing an article; 2) A user who has the right to approve or disapprove the purchasing of the article (referred to as a superior) signs the slip to give his approval to the purchasing of the article; and 3) The accounting division gives an order for the article in answer to the approved slip. A rule of the work flow for a user 1 to purchase an article is defined as "he draws up a purchase slip, gains the approval of his superior to the purchase of the article, and the accountant sees the approved slip and gives an order for the article". The definition is stored as the rule of the work flow in the data base 15 of the group shared environment 2.

In this instance of the embodiment, it is assumed that the four rules of the work flow, which are declaratively stated, are stored in the data base 15 of the group shared environment 2. These rules may be defined by the user interface 14, for example.

task (? user 1, article purchase processing)→ task (? user 1, slip draw-up, ? purchase slip), task (? user 1, approval request, ? purchase slip, ? approval sign), task (? user 1, order request, ? purchase slip, ? approval sign).

task (? user 1, approval request, ? purchase slip, ? approval sign)→ superior (? user 1, ? user 2), task (? user 2, approval process, ? purchase slip, ? approval sign), task (? user 1, order request, ? purchase slip, ? approval sign).

task (? user 1, order request, ? purchase slip, ? approval sign)→ accountant (? user 2), task (? user 2, ordered, ? purchase slip, ? approval sign).

task (? user 1, purchase slip draw-up, ? purchase slip)

form pick-out (purchase slip draw-up, ? form), task (? user 1, write-out, ? form, ? purchase slip).

In each of the above rules, the left side of "→" is the conditional part, and the right side is the execution part. A series of characters with sign "?" attached to the head thereof indicates a variable. The scope of the variable is within one rule in which the variable will appear, for the sake of description. For this reason, those four divided rules may be stored and managed independently.

When Mr. H starts the purchase slip process, a quest with a goal of "task (H, purchase processing" is generated in the personal data base 11 for Mr. H.

The query portion 12 of the user environment 1 for Mr. H retrieves a rule having a conditional part matching the goal by the bidirectional pattern matching, in deciding upon a variable, and will determine the execution part. As a result, the rule to be used in executing the goal is determined, to thereby realize the work flow.

If the rule for the article purchase process is not contained in the data base of Mr. H, the query portion 12 fails in the execution of the goal, or (H, purchase processing". In this case, the unsolvable goal is transferred as a tapple to the tapple space 17 of the group shared environment 2.

The query portion 16 of the group shared environment 2 reads the tapple from the tapple space 17, and searches the data base 15 for the rule. As recalled, the four rules for the article purchase process are stored in the data base 15 of the group shared environment 2. Accordingly, the query portion 16 picks out a rule that matches the rule for the article purchase process, from those four rules. In this instance, the rule matches the following rule:

task (? user 1, article purchase processing)→task (? user 1, slip draw-up, ? purchase slip), task (? user 1, approval request, ? purchase slip, ? approval sign), task (? user 1, order request, ? purchase slip, ? approval sign).

The value of the variable, "? user 1", is "H", and the conditional part, "task (? user 1, article purchase processing)", matches "task (H, article purchase processing)". The retrieving operation is performed in the order of the rules registered in the data base.

The rule retrieved is applied to the article purchase process, and the tasks in the execution part are successively executed. The task, "task (H, slip draw-up, ? purchase slip)", is first executed. The query portion retrieves a rule that matches the goal and applies it to the article purchase process. In this instance, it matches the following rule:

task (? user 1, purchase slip draw-up, ? purchase slip)→ form pick-out (purchase slip draw-up, ? form), task (? user 1, write-out, ? form, ? purchase slip).

This rule is used for the article purchase process. The value of the variable, "? user 1", is "H", and the tasks in the execution part are successively executed.

The task, "form pick-out (purchase slip draw-up, ? form)", is first executed. This task states a process to pick out a purchase slip form from the document data base. The system picks out the purchase slip form from the document data base, puts the "purchase slip form" into the variable "? form", and returns "form pick-out (purchase slip draw-up, purchase slip form) to the tapple space 17.

Then, the query portion 16 will execute the task "task (? user 1, write-out, ? form, ? purchase slip)". Since the value of "? user 1" is "H", and the value of "? form" is "purchase slip form", the query portion 16 will execute the task "task (H, write-out, purchase slip form, ? purchase slip)". The data of this task is not contained in the data base 15 of the group shared environment 2. As described above, the unsolvable goal is transferred as a tapple to the tapple space 17 of the group shared environment 2. Accordingly, "task (H, write-out, purchase slip form, ? purchase slip)" is transferred to the tapple space 17. In this instance, the system recognizes that the user as an executor who executes the task is Mr. H as the first argument, and this tapple is transferred to the tapple space 13 for Mr. H. This transfer of the tapple is carried out by the query portion 16 in the group shared environment 2 or the transfer demon process 3.

When the tapple reaches the tapple space 13, the query portion 12 detects it, reads the tapple from the tapple space 13, and will execute it. It is assumed that the following rule is contained in the personal data base 11 for Mr. H:

task (? user 1, write-out, ? document form, ? document substance)→ copy (? document form, ? document substance), word processor start-up (? document substance).

This rule matches the "task (H, write-out, purchase slip form, ? purchase slip)". In this case, the value of the variable "? user 1" is "Mr. H", and the value of "? document form" is "purchase slip form". The variable "? document substance" corresponds to "? purchase slip".

The rule "H, write-out, purchase slip form, ? document substance" is used, and the tasks of the execution part are successively executed. The task, "copy (purchase slip form, ? document substance)", is first executed, and subsequently the task, "word processor start-up (? document substance)", is executed. In executing these tasks, the query portion 12 replaces these with the commands of the system and the start-up of the application.

In a case where Mr. H does not have such a rule in his data base, and an applicable rule is not found, this goal will be sure to be unsolvable or unsuccessful in its execution in the query portion 12 of the user environment 1 of Mr. H. The goal is the task which the user environment 1 executes at the request of the transfer demon process 3. Hence, it will never be returned again to the tapple space 17 of the group shared environment 2. The goal is presented to Mr. H through the user interface 14 instead. At this time, the user interface 14 presents the variable portion, or the portion of "? purchase slip", as a document to be formed, to the user. In this instance, Mr. H knows on the user interface 14 that he must draw up the document substance. Mr. H himself draws up the document substance for himself, and enters the type of document involving a purchase slip as the product to the query portion from the user interface 14, and returns to the process when the applicable rule is found. The document substance of the purchase slip can be drawn up by writing out necessary matters in the purchase slip form by a word processor, for example.

Mr. H writes out the necessary matters in a "purchase slip document" by a word processor, and enters the product into the query portion from the user interface 14. Then, the query portion 12 interprets that the "task (H, write-out, purchase slip form, ? document substance)" has been proved, and decides that it is true. The completion of the proving of the task implies that the first goal "task (H, purchase slip draw-up, ? purchase slip)" that is obtained by directly developing the original goal, or "task (H, article purchase process)", is also proved, and it is also true. The variable "? purchase slip" is determined to be "purchase slip document" written out by Mr. H.

Since it is possible to transmit/receive the information of variables bidirectionally between the started-up task and the applied rule, even a value partially containing a variable is also available for the variable. In determining the value of the variable "? purchase slip", "purchase slip document, reply request (? reply document)", not "purchase slip document", may be used for the value of the variable. In this case, the "purchase slip document" is transferred to the subsequent task, and additionally it is possible to request a replay indicative of the receipt of the "purchase slip document" by the "reply request (? reply document)". Further, there is no need of altering the rule. The determined value of the variable is transferred to all the tasks containing the variable. Then, the reply to the receipt of the determined value may be received by "? reply document".

Subsequently, the query portion 16 of the group shared environment 2 processes the subsequent task "task (H, approval request, purchase slip document, ? approval sign)" which is obtained by directly developing the original goal "task (H, article purchase process)", and "task (H, order request, purchase slip document, ? approval sign)". In this case, the query portion 16 searches the data base 15 of the group shared environment 2 for an applicable rule, and applies the rule to the current processing operation. If failing to retrieve the applicable rule, the quest portion outputs a tapple to the tapple space 17 of the group shared environment 2. The quest portion searches the personal data base 11 for Mr. H or the data base of another group shared environment 2 or another user for the applicable rule. If failing to find the applicable rule, the query portion requests Mr. H or a user who can solve the task to solve the task. For the data base retrieval of "superior (H, ? user 2), for example, in the rule, if it cannot be retrieved from the personal data base, it is transferred as a tapple to the tapple space 17 in the group shared environment 2, and the data base in the group shared environment is searched as in the previous case. The work flow process is executed by repeating the operations as mentioned above.

According to the present invention, the interpreting/executing means may concurrently start up at least two tasks contained in the series of tasks in the execution part of a rule before the execution of a task is completed. In this case, the task sometimes is started up in a state that the value of the related variable is undetermined. The interpreting/executing means temporarily stores information for unifying the same variables having undetermined values. When in a task the variable having the undetermined value is determined in its value, the interpreting/executing means sets all of the unified variables at the same value in all of the tasks on the basis of the unifying information. With this feature, when a task is being executed according to a procedure described in a rule of a work flow, and a user does not yet complete the execution of processing the task, he can start up the subsequent task if required. Every time each product (document) to be formed is completed during the execution of processing the task, the task is automatically transferred to the subsequent task already started up. This transfer can be made without any alteration of the rule. Thus, there is no need of making the advancing direction of processing the task series in a work flow coincident with the direction of transferring the product. The order of executing the tasks may flexibly be changed in the rule of the same work flow.

The values of the unified variables may be determined in a manner that when the backtrack is performed, in each task to which the system goes back, only the variable whose value is set up in the task in his execution history is returned to its undetermined state. When monitoring this process, the user discriminatively knows the products to be invalid and the products left valid. During the execution of the tasks and in the process of the backtrack, if the series of the executed series and the determined values of the variables are stored and the redundant portion of the task, which results from the backtrack, is removed, the user may list up the series of the executed tasks and processes, the documents concerning the work flow, the documents valid as the products, users who have a commit to the work flow, and the like.

Let us consider a situation where an article must be ordered in a hurry, but a superior is absent for his business trip. In this situation, a work flow process progresses in the order of stating the tasks, but stopped at the task of the approval process. An example of novel and unique means to realize the flexible control of the executing order of the tasks by the work flow support system of the present invention will be described hereinafter. Description will be given on the assumption that a user who wants an article in a hurry directly delivers a purchase slip to the accounting division by bypassing his superior, and in answer to the purchase slip, the accounting division gathers information necessary for ordering the article and draws up an order slip before the purchasing of the article is approved.

When placed in such a situation, a user can forcibly advance the work flow procedure to the next task by operating the user interface 14. The action required for the user to advance the procedure is to merely input the assumption that the goal of "task (? user 1, approval request, ? purchase slip, ? approval sign) would be proved, into the query portion 12. When receiving the assumption, the query portion 12 recognizes that the goal has been proved, and executes the next computing process, and delivers a purchase slip as the result of the computation to the accounting division. In other words, the query portion 12 executes the task subsequent to the bypassed task.

When the superior returns from his business trip, and wants to disapprove the purchasing of the article, he needs only to set a status of the approval process to a disapproval status, through the user interface 14. When the task, or the approval process, is set to the disapproval status, the query portion recognizes that the goal of the task is proved to be false, and makes the subsequent proving operation invalid, resets the variables that are determined in the subsequent proving operation to the undetermined state, and backtracks.

When the superior approves the purchasing of the article, the variable "? approval sign" is determined to be "approval sign". In the present invention, all of the variables in the rules are treated as logical variables, and are unified.

Namely, by making the variables to be single, the variables appearing in the same execution parts are detected to be the same variables, and the reference pointer which means a same memory region is determined. Further, in a conditional part of a rule corresponding to a started-up task, a reference pointer is determined corresponding to the variables which are detected to be corresponding to a variable of a task during a pattern matching.

Therefore, when the variable "? approval sign" is determined to be "approval sign", all of the variables in the tasks of the ordering process under execution that are unified into the variable "? approval sign", are determined to be "approval sign". Accordingly, if the order of the start-up of the tasks and the inputting of the product to the system is changed, there is no need of altering the rule. In other words, the same rule can be used. Thus, the rules may be executed in the changed order.

There is another situation in which a user wants an article in a hurry, but his superior is absent for his business trip, and asks for another superior's approval of the purchasing of the article. In such a situation, the work flow support system considers that the task of the approval process is false, and executes an exceptional process. The "exceptional process" used here means a mere process to select another selectable item. In this sense, the exceptional process does not mean the process carried out in a usual system when a selectable item, which is not selected in a normal state, is selected from among the selectable items for the conditional branch described in the system.

When the superior is absent and the work flow process is left undone, the task, "task (? user 2, approval process, ? purchase slip, ? approval sign)" of those tasks in the execution part of the rule for the approval process is under execution. In this state, the user enters forcibly an input that "task (? user 2, approval process, ? purchase slip, ? approval sign)" in order to be false, into the query portion by the user interface 14. When the task is not accepted or it is not proved after a preset period of time, the system detects that it is in a false state.

The query portion 12 backtracks as by the method of the logical language, and looks up another possibility of the task, "superior (? user 1, ? user 2)", which is preceding to the present task of the task series. In other words, the query portion backtracks and retrieves another superior for his approval again, and asks the retrieved superior for his approval.

When the backtracking operation is required as in the above case, in the work flow support system of the present invention, the interpreting/executing means can jump back to the task or the process located several tasks or processes prior to the current task. A position where it starts to go back and a position where the jump-back of the process terminates can be designated when the rule is declared and during the execution of the task. Owing to this, the system can be controlled so as not to make excessive retries.

The rule for asking for the approval may also be stated as follows:

task (? user 1, approval request, ? purchase slip, ? approval sign)→
  superior (? user 1, ? user 2), |,
  task (? user 2, approval process, ? purchase slip, ? approval sign).

In the statement, "|" is called a commit operator, and its function is equivalent to the cut operator in the Prolog language. When the process advances to the right side of the commit operator, the goal is rejected somewhere, the process backtracks to the position of this operator and determines the rejection of the task that gives rise to the use of this rule, and backtracks to the retry of the preceding goal which called this task as the goal. In the above case, when the first superior disapproves the purchasing of the article, the determination of the disapproval is decided without searching for another superior. Then, the query portion feels for another possibility of the goal, "task (? user 1, approval request, ? purchase slip, ? approval sign)". If another applicable rule is not found, the query portion feels for another possibility of the goal "task (? user 1, purchase slip draw-up, ? purchase slip)". In this case, the variable "? purchase slip" has an undetermined value since the process is returned to the state thereof before the this goal is executed.

In the query portion 12 (or 16) of the present invention, usually, there is no need of describing the commit operator in the rule, unlike the case of the logical language. The rule presents a model of the task execution for all of those executions performed under the same rule. If the commit operator is described in the rule, the commit operator controls all of the executions performed under the rule containing the commit operator. It is for this reason that there is no need of describing the commit operator in the rule.

The commit operator, if required, may dynamically be inserted into the rule by a user from the user interface 14, every time a specific work flow process is started up. In the above case, it is preferable that the commit operator is not contained in the rule, and to define the rule such that when the first superior is absent and the work flow process is not executed even after a preset time elapses, the process backtracks to the preceding position and transfers it to another superior. When the superior has a commitment to the received task by processing it, the commit operator is inserted into the rule. When he disapproves the purchasing of the article, the approval process per se is put in a rejection state.

In such a situation where a work flow process progresses and reaches a position, and at this time the process may selectively use any of several applicable rules for the subsequent execution thereof, all of the rules may be stored in the data base 11 (or 15) in the work flow support system of the present invention. When the task of the selected work flow is put in a rejection state, another rule may be selected through the operation of the backtrack mechanism. Therefore, the rules on the exceptional cases that are predictable may be defined as in the same manner as of the normal rules. The "exceptional case" used here means a mere process to select another selectable item in the work flow support system of the present invention.

Such an exceptional case that a situation, not described in the system, takes place, is present as a matter of course.

Here, "a situation not described in the system" involves a situation where the process is not described in the system and another situation where the selectable items for a condition are not described. In the conventional work flow support system which is designed as a closed system, such an exceptional case is the case that should not take place, and if it takes place, the system is inoperable. On the other hand, the work flow support system of the present invention can readily deal with the exceptional case by merely requesting another environment to process the exceptional case, since it is designed as an open system.

An exceptional case takes place when a goal of the normal work flow is put in a rejection state and a selectable item that may be used in place of it is not found, that is, when a process other than the data and the rules stored in the whole system is required. When such an exceptional case takes place, the task giving rise to the exceptional case is a case that must be handled by man, or a user. When the exceptional case takes place, the work flow support system automatically incorporates the handling by man into the process per se, and continues the subsequent processing, as already described.

The query portion 12 (or 16) of the present invention outputs a goal that cannot be solved on the basis of the data in the data base 11 (or 15) to the tapple space 17 of the group shared environment 2. In other words, the query portion requests another environment to prove such a goal. This is done not only for the processing of the exceptional case but also for the processing of a normal case. The processing of the exceptional case that must be handled by man is a goal that cannot be solved using the data stored in the data base 11 (or 15) and is left in the tapple space 17. The process of the handling by man is a process for proving that the goal is true.

Also in the processing of the normal case, the query portion 12 which outputs the goal to the tapple space 17 merely waits for the result of proving the goal, and does not need to know which environment proves the goal and how the goal is proved. The processing of the exceptional case is exceptional to man, but it is not exceptional to the system. When viewing this processing from the system, it happened that a solver consisting of the data base of another environment and the query portion, which were used for solving the goal, was a man or user.

Thus, the work flow support system of the present invention can flexibly deal with such an exceptional case caused since the related rule is not described in the system by incorporating other data base and the processing by a man or user into the process of the system per se. This implies that it is possible to manage and support the work flow process including the processing by man.

As seen from the foregoing description, in response to the start-up of the first task by a user, the work flow support system of the present invention starts up the subsequent tasks and divides the tasks according to declaratively stated rules, thereby executing and managing the process of the work flow. If during the execution of the work flow process, the next applicable rule is selected from among the rules of the divided work flow, and is applied to the processing of the work flow, it is possible to eliminate time-consuming and troublesome works, which are unavoidable for a conventional electronic mail: for example, the address is written from the beginning or an explicit procedure including a branch instruction by a conditional judgement and the like is described.

When a task is being executed according to a procedure described in the rule of a work flow process, the user can start up the task subsequent to the task under execution before the execution of the latter task is not yet completed as occasion demands. Further, during the execution of a task, every time a product to be formed is produced, the product can be automatically transferred to the subsequent task already started up, without altering the rule. This feature enables the order of executing the tasks to flexibly be changed in the rule of the same work flow.

When an exceptional case that cannot be solved by the system occurs, the work flow support system incorporates the result of processing the exceptional case by man into the system, and continues the execution of the subsequent work flow process on the basis of the result. Accordingly, the work flow support system of the present invention can flexibly manage and support the whole work flow process including the processing by man.

What is claimed is:

1. A work flow support system, comprising:
   a plural number of rule-group storing means for storing rules, each of the rules, including:
   a conditional part, and an execution part, the conditional part and the execution part being declaratively stated in the rule,
   the conditional part being used for determining whether or not the rule to be applicable to a started-up task as a unit of work, and
   the execution part which is a series of tasks being for executing the tasks which satisfy the conditional part,
   an interpreting/executing means provided respectively in association with said rule-group storing means when a task is started-up, said interpreting/executing means selecting a rule having the conditional part applicable to the task from said rule-group storing means, and successively executing a series of tasks contained in the execution part associated therewith,
   detecting means operating such that, when said interpreting/executing means fails to find the rule having the conditional part applicable to the task started-up in said rule-group storing means, said detecting means detects the failure of starting up the task as a failure state of the task,
   task transferring means for transferring the task detected to be in a failure state by said detecting means to another interpreting/executing means,
   receiving means for receiving the result of executing the task from said another interpreting/executing means, and
   recovering means for recovering the task from the failure state on the basis of the execution result received from said receiving means.

2. The work flow support system of claim 1, wherein said interpreting/executing means, includes:
   detecting means operating such that, when said interpreting/executing means fails to find the rule having the conditional part applicable to the task in said rule-group storing means, said detecting means detects the failure of starting up the task as a failure state of the task,
   task transferring means for transferring the task detected to be in a failure state by said detecting means to another interpreting/executing means,
   receiving means for receiving the result of executing the task from said another interpreting/executing means,
   a first recovering means for recovering the task from the failure state on the basis of the execution result received from said receiving means,
   informing means for informing a user of the information of the task detected to be in a failure state by said detecting means,
   a user interface for inputting the result of user's execution of the task being in a failure state to said system in response to the information from said informing means,
   a second recovering means for recovering the task from the failure state on the basis of the execution result inputted by the user interface, and
   go-back means operating such that when neither of said first and second recovering means succeeds in recovering the task from the failure state, said go-back means causes said interpreting/executing means to go back to the task started up before the task being in a failure state is started up, and sets the preceding task in a failure state.

3. The work flow support system of claim 2, wherein said interpreting/executing means, includes;
   detecting means for detecting that a task started up is set in a failure state by said go-back means, a condition defined by said system or a user input,
   task transferring means for transferring the task detected to be in a failure state by said detecting means to another interpreting/executing means,
   receiving means for receiving the result of executing the task from said another interpreting/executing means, and
   recovering means for recovering the task from the failure state on the basis of the execution result received from said receiving means.

4. The work flow support system of claim 2, wherein said interpreting/executing means, includes;
   detecting means for detecting that a task started up is set in a failure state by said go-back means, a condition defined by said system or a user input,
   informing means for informing a user of the information of the task detected to be in a failure state by said detecting means,
   a user interface for inputting the result of user's execution of the task being in a failure state to said system in response to the information from said informing means, and
   recovering means for recovering the task from the failure state on the basis of the execution result inputted by the user interface.

5. The work flow support system of claim 2, wherein said interpreting/executing means, includes;
   detecting means for detecting that a task started up is set in a failure state by said go-back means, a condition defined by said system or a user input,
   reselecting means for selecting a rule, which is different from the already selected rule, from the rules stored in said rule-group storing means provided in association therewith, for the task detected to be in a failure state by said detecting means, and
   recovering means for recovering the task from the failure state by applying the rule selected by said reselecting means.

6. The work flow support system of claim 2, wherein said interpreting/executing means, includes;
   detecting means for detecting that a task started up is set in a failure state by said go-back means, a condition defined by said system or a user input,
   task transferring means for transferring the task detected to be in a failure state by said detecting means to another interpreting/executing means, receiving means for receiving the result of executing the task from said another interpreting/executing means, a first recovering means for recovering the task from the failure state on the basis of the execution result received from said receiving means, informing means for informing a user of the information of the task detected to be in a failure state by said detecting means, a user interface for inputting the result of user's execution of the task to said system in response to the information from said informing means, a second recovering means for recovering the task from the failure state on the basis of the execution result inputted by said user interface, reselecting means for selecting a rule, which is different from the already selected rule, from the rules stored in said rule-group storing means provided in association therewith, for the task detected to be in a failure state by said detecting means, a third recovering means for recovering the task from the failure state by applying the rule selected by said reselecting means, and go-back means operating such that when any of said first, second and third recovering means is unsuccessful in recovering the task from the failure state, said go-back means causes said interpreting/executing means to go back to the task started up before the task being in a failure state is started up, and sets the preceding task in a failure state.

7. A work flow support system comprising:

a plural number of rule-group storing means for storing rules, each of the rules, including:

a conditional part, and an execution part, the conditional part and the execution part being declaratively stated in the rule, the conditional part being used for determining whether or not the rule to be applicable to a started-up task as a unit of work, and the execution part which is a series of tasks being for executing the tasks which satisfy the conditional part, an interpreting/executing means provided respectively in association with said rule-group storing means when a task is started-up, said interpreting/executing means selecting a rule having the conditional part applicable to the task from said rule-group storing means, and successively executing a series of tasks contained in the execution part associated therewith, wherein the conditional part and the execution part of the rule include variables for transferring information when the rule is applied and the task is started-up, and the values of the variables or the values indicative of the memory locations of the variable values are bidirectionally transferred between the started-up task and the rule applied to the task.

8. The work flow support system of claim 7, wherein said interpreting/executing means, includes;

detecting means operating such that, when said interpreting/executing means fails to find the rule having the conditional part applicable to the task started up in said rule-group storing means, said detecting means detects the failure of starting up the task as a failure state of the task, informing means for informing a user of the information of the task detected to be in a failure state by said detecting means, a user interface for inputting the result of user's execution of the task being in a failure state to said system in response to the information from said informing means, and recovering means for recovering the task from the failure state on the basis of the execution result inputted by the user interface.

9. A work flow support system comprising:

a plural number of rule-group storing means for storing rules, each of the rules, including:

a conditional part, and an execution part, the conditional part and the execution part being declaratively stated in the rule, the conditional part being used for determining whether or not the rule to be applicable to a started-up task as a unit of work, and the execution part which is a series of tasks being for executing the tasks which satisfy the conditional part, an interpreting/executing means provided respectively in association with said rule-group storing means, when a task is started-up, said interpreting/executing means selecting a rule having the conditional part applicable to the task from said rule-group storing means, and successively executing a series of tasks contained in the execution part associated therewith, said interpreting/executing means including unifying/managing means for unifying variables of which the values are undetermined when a rule having the conditional part applicable to a started-up task is applied to the started-up task, and for generating and holding the unifying information, and substitution means for setting at the same value all of the variables unified by said unifying/managing means when in a task, the variable having the undetermined value is determined in the value.

10. The work flow support system of claim 9, wherein said interpreting/executing means, includes;

detecting means operating such that, when said interpreting/executing means fails to find the rule having the conditional part applicable to the task started-up in said rule-group storing means, said detecting means detects the failure of starting up the task as a failure state of the task, informing means for informing a user of the information of the task detected to be in a failure state by said detecting means, a user interface for inputting the result of user's execution of the task being in a failure state to said system in response to the information from said informing means, and recovering means for recovering the task from the failure state on the basis of the execution result inputted by the user interface.

11. A work flow support system, comprising:

a plural number of rule-group storing means for storing rules, each of the rules, including:

a conditional part, and an execution part, the conditional part and the execution part being declaratively stated in the rule, the conditional part being used for determining whether or not the rule to be applicable to a started-up task as a unit of work, and the execution part which is a series of tasks being for executing the tasks which satisfy the conditional part, an interpreting/executing means provided respectively in association with said rule-group storing means, when a task is started-up, said interpreting/executing means selecting a rule having the conditional part applicable to the task from said rule-group storing means, successively executing a series of tasks contained in the execution part associated therewith, wherein the interpreting/executing means concurrently starts up at least two tasks contained in the series of tasks in the execution part of a rule.

* * * * *